Nov. 10, 1959 P. E. F. KASSNER 2,912,609
SYNCHRONOUS MOTOR
Filed March 26, 1956
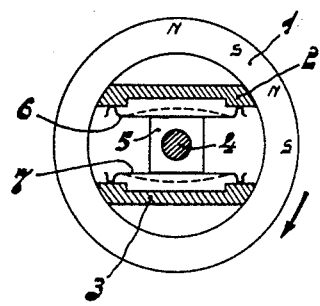
INVENTOR
PAUL EMIL FRITZ KASSNER
BY
AGENT United States Patent Office 2,912,609
Patented Nov. 10, 1959

2,912,609

SYNCHRONOUS MOTOR

Paul Emil Fritz Kassner, Eindhoven, Netherlands, assignor, by mesne assignments, to North American Philips Company, Inc., New York, N.Y., a corporation of Delaware Application March 26, 1956, Serial No. 573,814

Claims priority, application Netherlands April 7, 1955

4 Claims. (Cl. 310—156)

The present invention relates to a synchronous motor. More particularly, the invention relates to a self-starting synchronous motor having a permanent magnet rotor. As is well-known, such a motor can only start spontaneously, if specific steps are taken, for example, by combining the rotor with a part which is capable of starting asynchronously, such as, for example, a cage armature, but consequently the arrangement becomes complicated.

According to the invention, a self-starting synchronous motor is produced with the aid of relatively simple expedients. In accordance with the invention, a resilient member is positioned between the rotor and the rotary shaft. The natural frequency of the system "rotor-resilient member" is at least substantially equal to the frequency of the alternating supply voltage or a harmonic thereof.

When the stator is connected to the alternating voltage supply, the rotor is caused to vibrate until the frequency and the amplitude of the vibration are such that the rotor starts either in one or in the other direction.

The term "synchronous motor having a rotor" as used herein is to be understood to include a so-called linear motor in which the armature does not rotate but performs a linear movement.

In order that the invention may be readily carried into effect, it will now be described, by way of example, with reference to the accompanying drawing, wherein the single figure is a schematic diagram, partly in section, of the rotor arrangement of the present invention.

In the figure, the stator, which may be of a generally known type, is omitted for the sake of simplicity. Reference numeral 1 designates an annular permanent magnet rotor provided at the periphery with a plurality of poles N and S. Within the annular member 1 two securing members 2 and 3 are provided. A rotary shaft 4 has a square member 5 mounted on it. The square member 5 is clamped with some tension between two narrow leaf springs 6 and 7. The ends of the leaf springs 6 and 7 are supported from the members 2 and 3, respectively, but the middle portions of said leaf springs are free. If a voltage is applied to the stator, the rotor will move through a small distance due to a slight asymmetry of the stator poles, for example, in the direction of the arrows, and the next instant said rotor will move in the opposite sense. As a result, the leaf springs 6 and 7 are bent into the position shown by broken lines. Since the system rotor-leaf springs will come into resonance after a few, for example 4 or 5, cycles of the alternating voltage, the amplitude and the frequency of the rotor movement will become such that the rotor breaks the deadlock and thereupon rotates in synchronism with the stator field. Since the rotor in accordance with the invention is capable of a slight rotary movement relative to the loaded shaft, the rotor after attaining the synchronous frequency immediately produces the full torque.

While the invention has been described by means of a specific example and in a specific embodiment, I do not wish to be limited thereto, for obvious modifications will occur to those skilled in the art without departing from the spirit and scope of the invention.

What is claimed is:

1. A permanent magnet rotor arrangement for a synchronous motor adapted to be energized by an alternating supply voltage, comprising rotor means producing a magnetic field, a pair of spaced supporting members affixed to said rotor means, a rotatable shaft positioned between said supporting members, a pair of yieldable members each being supported at both ends on a different supporting member and having a freely movable median portion, said yieldable members having a natural frequency at least substantially equal to $n$ times the frequency of said alternating supply voltage, where $n$ is a whole number, and means enabling both said yieldable members to support said shaft between them.

2. A permanent magnet rotor arrangement for a synchronous motor adapted to be energized by an alternating supply voltage, comprising a ring member producing a magnetic field, a pair of spaced supporting members affixed to said ring member, a rotatable shaft positioned between said supporting members, a pair of yieldable members each being supported at both ends on a different supporting member and having a freely movable median portion, said yieldable members having a natural frequency substantially equal to $n$ times the frequency of a harmonic of said alternating supply voltage, where $n$ is a whole number, and means enabling both said yieldable members to support said shaft between them.

3. A permanent magnet rotor arrangement for a synchronous motor adapted to be energized by an alternating supply voltage, comprising a ring member producing a magnetic field, a pair of spaced supporting members affixed to said ring member, a rotatable shaft positioned between said supporting members, a pair of resilient leaf springs each being supported at both ends on a different supporting member and having a freely movable median portion, said springs having a natural frequency at least substantially equal to $n$ times the frequency of said alternating supply voltage, where $n$ is a whole number, and means enabling both said springs to support said shaft between them.

4. A permanent magnet rotor arrangement for a synchronous motor adapted to be energized by an alternating supply voltage, comprising a ring member producing a magnetic field, a pair of spaced supporting members affixed to said ring member, a rotatable shaft positioned between said supporting members, a pair of resilient leaf springs each being supported at both ends on a different supporting member and having a freely movable median portion, said springs having a natural frequency at least substantially equal to $n$ times the frequency of said alternating supply voltage, and means enabling both said springs to support said shaft between them, said enabling means comprising a substantially rectangular element mounted on said shaft and having opposite linear sides in engagement with adjacent median portions of said springs.

References Cited in the file of this patent

UNITED STATES PATENTS

| 2,250,395 | Russell | July 22, 1941 |
| 2,541,830 | Phaneuf | Feb. 13, 1951 |

OTHER REFERENCES

Abstract Ser. No. 160,516, published Aug. 8, 1952, 661 O.G. 310 and 311.